United States Patent [19]

Genero et al.

[11] Patent Number: 5,713,112
[45] Date of Patent: Feb. 3, 1998

[54] ENGAGING DEVICE

[76] Inventors: Claude Paul Genero; Gail Ann Genero, both of 30 Phillips Street, Dianella, Western Australia 6062, Australia

[21] Appl. No.: 666,218

[22] Filed: Jun. 20, 1996

Related U.S. Application Data

[63] Continuation of Ser. No. 116,586, Sep. 7, 1993, abandoned.

[30] Foreign Application Priority Data

Sep. 8, 1992 [AU] Australia .................. PL4551

[51] Int. Cl.⁶ ........................................ B25B 5/04
[52] U.S. Cl. .................. 24/490; 24/493; 24/495; 24/499; 24/513; 248/316.5; 248/231.51; 269/33; 269/238
[58] Field of Search ................. 24/648, 494, 487, 24/490, 513, 495, 496, 499, 497, 493; 269/33, 238; 248/321, 316.5, 13, 231.5

[56] References Cited

U.S. PATENT DOCUMENTS

| 311,800 | 2/1885 | Alapaw . |
|---|---|---|
| 522,882 | 7/1894 | De Loney . |
| 573,891 | 12/1896 | Martin . |
| 1,563,817 | 12/1925 | Wright . |
| 1,761,497 | 6/1930 | Smith . |
| 1,788,507 | 1/1931 | Burgin . |
| 4,071,930 | 2/1978 | Tanaka . |
| 4,240,604 | 12/1980 | Brach . |
| 4,249,610 | 2/1981 | Loland . |
| 4,514,885 | 5/1985 | Delahousse et al. . |
| 5,446,948 | 9/1995 | Genero et al. . |

FOREIGN PATENT DOCUMENTS

| 639708 | 7/1948 | United Kingdom . |
|---|---|---|
| 931451 | 7/1963 | United Kingdom . |
| 1104589 | 3/1966 | United Kingdom . |
| 1212248 | 9/1968 | United Kingdom . |
| WO92/08578 | 5/1992 | WIPO . |

Primary Examiner—James R. Brittain

[57] ABSTRACT

An engaging device for releasably engaging an object. The engaging device comprising a supporting part and an engaging part mounted on the supporting part for pivotal movement about two spaced apart axes between two stable conditions, one being an engaging condition and the other being a release condition. The two axes being defined by means carried on a portion of the supporting part, the supporting part being resiliently deflectable at said means defining the two axes to accommodate movement of the engaging part between the two stable conditions and to urge the engaging part into one or other of the two stable conditions. The supporting part may define a housing which accommodates the engaging part and which provides protection to the resilient portions of the device.

47 Claims, 7 Drawing Sheets

ENGAGING DEVICE

RELATED APPLICATION

This application is a continuation of U.S. application Ser. No. 08/116,586 filed Sep. 7, 1993 abandoned.

BACKGROUND OF THE INVENTION

This invention relates to an engaging device for releasably engaging an object. The engaging device may find application in various fields where it is necessary to releasably engage an object in a simple and effective yet durable manner.

There are various engaging devices which move between engaging and release conditions by way of a snap-action process. Typical of such devices is an articulable article which is described and illustrated in GB 1212248 (Westhem) and which is well adapted for use as a clipping or gripping device. The articulated article, when functioning as a gripping device, comprises first and second swingable members movable between closed (engaging) and an open (release) positions. The swingable members are mounted on a resiliently bendable support structure comprising two upright members, the first swingable member being hingedly joined to one of the upright members through a flexible web constituting a first hinge line and the second swingable member being hingedly joined to the other of the upright members through a further flexible web constituting a second hinge line. The first and second swingable members are hingedly joined together through a third hinge line. The resiliently bendable characteristic of the support structure is provided by at least one of the upright members being resiliently bendable so allowing the two swingable members to swing respectively about the first and second hinge lines between the open and closed positions. In moving between the open and closed positions, the swingable members move through an unstable "over-toggling" position in which the three hinge lines are in alignment, and the resiliently bendable support structure deflects outwardly to accommodate this movement. As the support structure deflects outwardly, its resilient nature influences the swingable members and produces the snap-action between the open and closed positions.

Somewhat similar engaging devices are disclosed in U.S. Pat. No. 4,071,930 (Tanaka), U.S. Pat. No. 4,240,604 (Brach) and U.S. Pat. No. 4,514,885 (Delahousse).

A common feature of all of the aforementioned prior art engaging devices is that the swingable members are supported on a support structure which is resiliently bendable to allow the arms to swing through an "over-toggling" position, with the resilient nature of the support structure influencing the swingable members as they move between two stable positions one each side of the unstable "over-toggling" position.

A further common feature of the prior art devices is that they are of one-piece construction with various sections connected together with film hinges. This has disadvantages in certain circumstances. One disadvantage is a limitation in the strength that can be achieved at the film hinges. Another disadvantage is that the support structure interferes with access to the inner side of the swingable members.

While the prior art engaging devices do perform satisfactorily in many situations, there are other situations in which it would be useful to have a snap-action engaging device which does not have any resilient portions coming into contact with the object to be engaged. In one arrangement this can be accomplished by having the supporting part comprising a housing for accommodating the resilient portions thereby ensuring that the engaging device is very durable and long lasting. Additionally, it would be useful to have an engaging device where the supporting part does not interfere with access to the inner side of the swingable members. This benefit arises because the engaging part is displaced from the supporting part along the pivot axis.

SUMMARY OF THE INVENTION

The present invention seeks to provide such an engaging device.

Broadly, the invention resides in an engaging device for engaging an object, the engaging device comprising a supporting part, an engaging part mounted on the supporting part for pivotal movement about two spaced apart axes between two stable conditions one of which is an engaging condition, wherein said engaging device includes means for at least one of said pivot axes being laterally deflectable each time the engaging part moves between the two stable conditions and wherein said two axes are defined by means carried on two portions of the supporting part, said portions being fixed with respect to each other during movement of the engaging part between the two stable conditions.

With this arrangement, compressive stresses are induced into the supporting part as the engaging part moves between the two stable conditions thereby to urge the engaging part towards one of or the other of the two stable conditions with a snap-action.

The supporting part may be resiliently deflectable at said means defining the two axes.

In one arrangement, the means defining at least one of the two axes may comprise a pivot pin which is resiliently bendable laterally during movement of the engaging part between the two stable conditions. Said pivot pin may be resiliently bendable to provide the lateral deflection. With this arrangement, the supporting part may be substantially rigid apart from said pivot pin. It is the resiliently bendable nature of said pivot pin which provides the supporting part with the characteristic of being resiliently deflectable.

In another arrangement, at least one of the pivot axes may be mounted on portion of the supporting part for sideways movement, the sideways movement of the pivot axis providing the lateral deflection of the pivot axis. Said pivot axis may be slidably mounted on said portion of the supporting part for sideways movement. A resistance means may be provided for resiliently resisting sideways movement of the pivot axis. Said resistance means may comprise a compression spring. Said portion of the supporting part may be substantially rigid, with the resiliently deflectable nature of said at least one of the pivot axes providing the supporting part with the characteristic of being resiliently deflectable.

The engaging part can be as thick and as rigid as is desired, it only being necessary for the resilient portion of the supporting part to be of some construction which allows it to regain its original shape or position after bending, stretching or compressing as the engaging part moves between the two stable conditions.

Preferably, the engaging part is displaced from said portion of the supporting part in a direction along the pivot axes so as to be offset from said portion of the supporting part.

The engaging part may comprise a bridge portion positioned between said pivot axes. The engaging part may further comprise two spaced apart arm portions between which the bridge portion extends, said arm portions each being mounted on said supporting part for pivotal movement about a respective one of the pivot axes between a first position corresponding to said engaging condition and a second position corresponding to said release condition.

In this arrangement, the pivot axes deflect away from each other as the engaging part moves between the two stable conditions. The center of the bridge portion may be provided with any suitable hinge. Said hinge can be made out of steel or any other comparable material.

While each pivot axis may be defined also by any suitable hinge, it is preferably defined by a pivot pin provided on the supporting part. With such an arrangement, a hole is provided in each arm portion for receiving a respective one of the pivot pins, the spacing between the holes prior to the pivot pins being received therein being slightly larger than the spacing between said pivot pins so that compression is induced in the pivot pins as the engaging part moves between the two stable conditions.

The supporting part preferably comprises a housing which accommodates the engaging part. An advantage of this arrangement is that the housing can provide structural rigidity to the device and also provide protection for any resilient portion of the supporting part. Each pivot axis may be defined by a pivot pin at least one end of which is supported on a portion of the supporting part offset from the engaging part.

In still another form the invention resides in an engaging device for releasably engaging an object, the engaging device comprising a supporting part, an engaging part mounted on the supporting part for movement between engaging and release conditions, said engaging part having a first portion and a second portion, the first portion being adapted to co-operate with said supporting part to engage the object when in the engaging position, the second portion being exposed for contact with the object when the engaging part is in the release condition whereby upon such contact at a predetermined magnitude of force said engaging part is caused to move from the release condition into the engaging condition, said engaging part mounted on the supporting part for pivotal movement about two spaced apart axes between two stable conditions one being an engaging condition and the other being a release condition, at least one of the two axes being deflectable laterally to accommodate movement of the engaging part between the two stable conditions, the two axes being defined by means carried on a portion of the supporting part, the engaging part being displaced from said portion of the supporting part in a direction along the pivot axes so as to be offset from said portion of the supporting part.

The first portion of the engaging part may comprise a pair of arm portions and said second portion comprises a bridge portion extending between the arm portions.

Preferably, the supporting part comprises a housing accommodating said engaging part. The housing preferably has a recess for receiving said object whereby the object is releasably retained in said recess when the first portion of the engaging part is co-operating with said recess. With this construction, the arm portions preferably extend into said recess when the engaging part is in the engaging condition and the bridge portion extends into the recess when the engaging part is in the release condition. The feature of the recess co-operating with the engaging part to releasably engage the object is particularly useful as the inner edge of the recess can isolate the bridge portion from the object when the engaging part is in the engaging condition.

In still another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, wherein at least one of said pivot axes is defined by a pivot pin, said pivot pin being resiliently bendable laterally during movement of the engaging part between the two stable conditions.

In still another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, wherein at least one of said pivot axes is defined by a pivot pin, said pivot pin being bendable laterally during movement of the engaging part between the two stable conditions.

In still another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, the engaging part comprising a bridge portion positioned between said pivot axes, at least one of the two pivot axes being moveable relative to the supporting part for selective adjustment in order to vary the spacing between the pivot axes and thereby control the magnitude of the force necessary to move the engaging part between one of the two stable conditions, said at least one of the pivot axes being moveable throughout a range of possible positions to provide said selective adjustment, and means being provided for releasably retaining said at least one of said pivot axes in a selected one of said possible positions.

In yet another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, wherein the engaging part comprises a bridge portion positioned between said pivot axes, wherein a weakening means is provided on the bridge portion and wherein abutment portions are provided on opposed sides of said weakening means whereby the abutment portions are adapted to abut one another during movement of the engaging part from the release condition to the engaging condition.

In still another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, at least one of the spaced apart axes being deflectable laterally, a control means comprising a slide moveable relative to the supporting part, said slide being operatively connected to said engaging part and being adapted to prevent said spaced apart axes from deflecting away from each other when the engaging part is in the engaging condition, the engaging part comprising a bridge portion positioned between said pivot axes.

In still another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, wherein at least one of said spaced apart axes is resiliently deflectable laterally, said at least one axis being defined by means slidably mounted on the supporting part for sideways movement laterally of the respective pivot axis.

In still another form the invention resides in an engaging device for releasably engaging an object, the engaging device comprising a supporting part, an engaging part mounted on the supporting part for pivotal movement about two spaced apart axes between two stable conditions one being an engaging condition and the other being a release condition, wherein at least one of said pivot axes is laterally deflectable and is defined by a pivot pin, said pivot pin being carried on a portion of the supporting part, said portion of the supporting part being fixed against displacement when the engaging part moves between the two stable conditions.

DETAILED DESCRIPTION OF PREFERRED EMBODIMENTS

Referring now to FIGS. 1 to 7 of the drawings, the engaging device 10 according to the first embodiment is adapted to releasably engage an object 11 of rectangular cross-section. The engaging device of this embodiment can engage and release the object simply by pushing it into contact with the object and pulling it out of contact with the object, as will be explained later.

Figure 1:
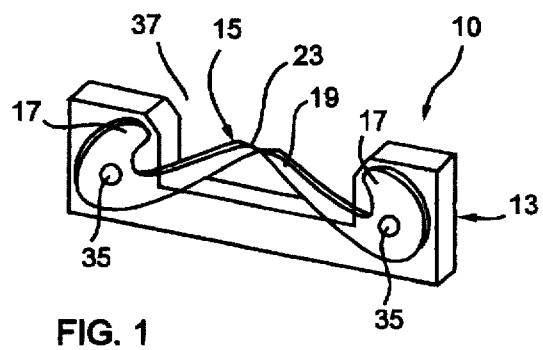
FIG. 1 is a perspective view of an engaging device according to a first embodiment.
Figure 2:
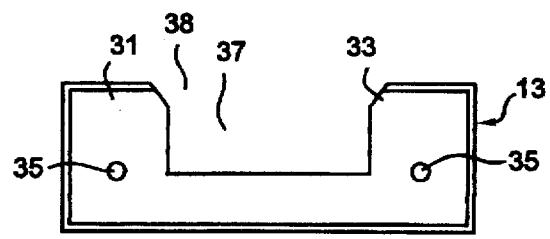
FIG. 2 is a schematic plan view of a supporting part of the engaging device according to the first embodiment.
Figure 3:
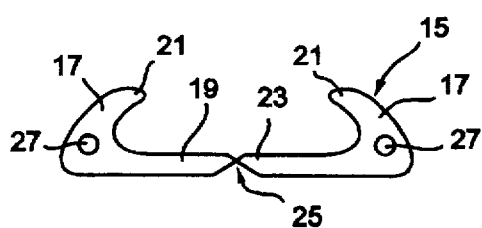
FIG. 3 is a schematic plan view of an engaging part of the engaging device according to the first embodiment.
Figure 4:
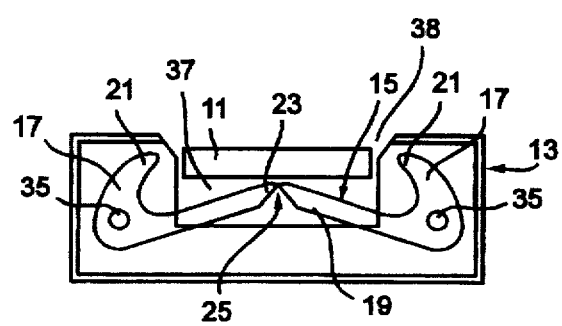
FIG. 4 is a plan view of the engaging device according to the first embodiment shown in a release position but in readiness to engage an object.
Figure 5:
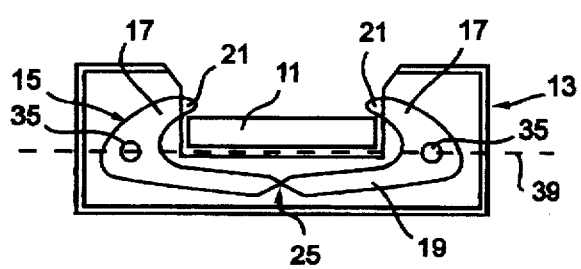
FIG. 5 is a view similar to FIG. 4 with the exception that the engaging device is shown in an engaging position in which it has engaged the object.

The engaging device 10 comprises a supporting part 13 and an engaging part 15 mounted on the supporting part for movement between two stable conditions, one being an engaging condition (as shown in FIG. 5 of the drawings) in which the engaging device is in engagement with the object 11 and the other being a release condition (as shown in FIG. 4 of the drawings) in which the object 11 can be separated from the engaging device.

The engaging part 15 comprises a pair of spaced arm portions 17 and an elongated bridge portion 19 extending between the arm portions 17. The arm portions 17 are so configured that the free ends thereof define claws 21 which can close around the object 11 when the engaging device is in the engaging condition.

The engaging part may be formed from two identical parts joined together by a hinge 25.

The engaging part 15 is provided with a pivot hole 27 in each arm portion 17 at a location between the bridge portion and the free end of the arm, the purpose of which will be explained later.

The supporting part 13 comprises a housing 31 having a cavity which accommodates the engaging part 15, the cavity being defined between a pair of spaced apart housing walls 33. A pair of pivot pins 35 extend between, and are rigidly supported at their respective ends on the housing walls. The pivot pins 35 are rigidly supported at their ends on the housing walls, and are not fixed against lateral movement with respect to each other. The supporting part 13 accommodates the engaging part 15 in the housing 31 with the pivot pins 35 received within the pivot holes 27 in the engaging part. With this arrangement, the pivot pins 35 define pivot axes about which the arm portions 17 can pivot on movement of the engaging part between the engaging and release conditions. This construction results in the walls 33 of the housing being located on opposed sides of the engaging part in a direction along the pivot axis. In other words, the engaging part is displaced or offset from the housing walls 33 in the direction along the pivot axis. Furthermore, the pivot pins are supported at locations offset from the engaging part.

The housing also has a recess 37 for receiving the object 11 to be engaged by the engaging device. The recess 37 opens at 38 onto an edge of the housing. The engaging part is disposed within the housing such that when it is in the engaging condition (as shown in FIG. 5 of the drawings) the claws 21 extend into the recess and the bridge portion is disposed partly or wholly within the confines of the housing. On the other hand, when the engaging part is in the release condition (as shown in FIG. 4 of the drawings), the claws 21 are retracted from the recess and the central region of the bridge portion 19 extends into the recess from the side of the housing opposite the opening at 38.

The bridge portion 19 is movable between two extreme positions, one being a first position corresponding to the engaging condition of the engaging part 15 and the other being a second position corresponding to the released position. The spacing between the pivot pins 35 is less than the distance between the pivot holes 27 in the engaging part 15 prior to fitting of the engaging part on the supporting part. Consequently, the pivot pins 35 undergo lateral deflection when the engaging part moves between the two extreme positions. There is an unstable zone between the two extreme positions which results in the bridge portion being urged into one or the other of the two extreme positions. As the bridge portion passes through the unstable zone, it moves through an "overtoggling" or "over-centre" condition in which the hinge 25 crosses a line 39 extending between the pivot axes defined by the pivot pins 35. The unstable condition of the bridge portion 19 arises because the resilient pivot pins are caused to deflect resiliently as the engaging part passes through the unstable zone to accommodate movement between the two extreme positions. The resilient deflection occurs about the centre of the pivot pins.

Figure 6:
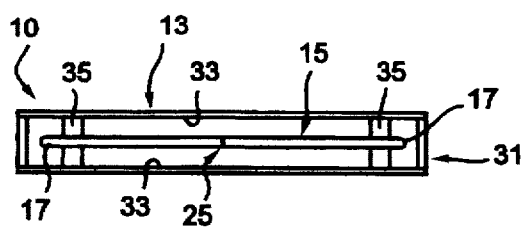
FIG. 6 is a side view showing the engaging device with the engaging part in a stable position corresponding to either the engaging position or the release position of the engaging device.
Figure 7:
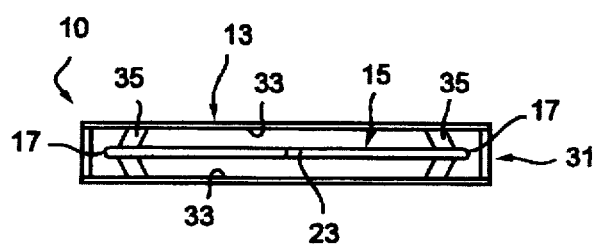
FIG. 7 is a view similar to FIG. 6 with the exception that the engaging part is in an unstable position where the pivot pins have deflected laterally as the engaging part moves between the two stable conditions.

The lateral deflection of the resilient pivot pins can be seen by reference to FIGS. 6 and 7 of the drawings. In FIG. 6 the resilient pivot pins 35 are shown with the engaging part in a stable position corresponding to either the engaging position or the release position of the engaging device. In FIG. 7 the resilient pivot pins 35 are shown in a condition where they have undergone deflection in the lateral direction as the engaging part moves between the two stable conditions. With this arrangement, compressive stresses are induced into said portion of the supporting part as the engaging part moves between the two stable conditions thereby to urge the engaging part towards one of or the other of the two stable conditions with a snap-action.

The pivot pins can be constructed with an annular constriction in their center area in order to maintain the engaging part in the said area along the pivot pins.

Once the bridge portion 19 is in one of its extreme positions, it remains in that position until subjected to an external influence. In the present embodiment, the external influence comprises a force of predetermined magnitude applied to the engaging part 15. The necessary force arises as a result of reaction between the engaging part 15 and the object 11 being engaged. This allows the engaging device to be engaged with the object by simply pushing the engaging device and the object together, and to be separated from each other simply by pulling the object and the engaging device apart. Specifically, when it is to be engaged by the engaging device, the object 11 is introduced into the recess 37; at this stage, the engaging part has the claws 21 retracted and the central region of the bridge portion 19 extends into the recess. As the object enters the recess, it contacts, and bears against, the central region of the bridge portion. If the contact force exceeds a predetermined magnitude, the bridge portion is caused to move through the unstable zone and assume the other extreme position in which the claws extend into the recess around the object. In this way, the object is secured to the engaging device. The object is released from the engaging device by retracting the claws 21 and this can be accomplished by applying a pulling force between the object and the engaging device so as to create a reaction between the claws and the object which produces torque on each of the claws of sufficient magnitude to cause the claws to swing and to move the bridge portion 19 through the unstable "over-toggling" position into the other extreme position corresponding to the release condition of the engaging device.

Figure 8:
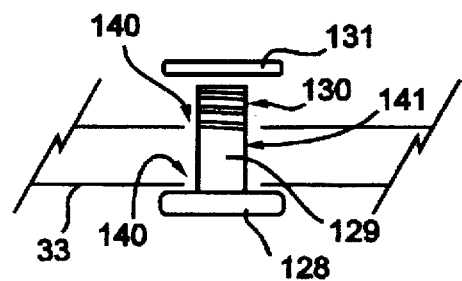
FIG. 8 is a cross-sectional view of a laterally adjustable pin.
Figure 9:
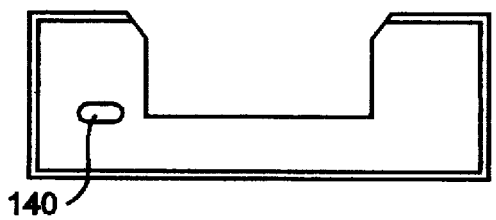
FIG. 9 is a plan view showing direction and location of slot on housing for a laterally adjustable pin.

In the second embodiment, only one of the pivot pins is resilient, the other pivot pin is rigid and fixed during movement of the engaging part between the two stable conditions. Said rigid pivot pin can also be laterally adjustable in order to regulate the spacing between the pins and thereby control the magnitude of the force necessary to move the engaging part into one of the two stable positions. FIGS. 8 and 9 illustrate how such adjustment of the spacing between the pivot pins can be achieved. FIG. 8 shows the rigid pivot pin in a form of a bolt 141 with a head 128, a shaft 129 and a threaded end 130 ready to receive a locking nut 131.

FIG. 9 shows how the housing is provided with respective slots 140 on each wall 33 of the housing in order to accommodate lateral adjustment of said pin. It should be noted that said adjustable pin has to be firmly fixed in order for the device to function properly.

Another advantage of having one of the pivot pins in the form of a bolt 141 is that the engaging device can be dismantled allowing easy replacement of the engaging part. With this arrangement it is preferable to use a resilient pin with only one end permanently fixed to one of the walls of the housing.

Figure 10:
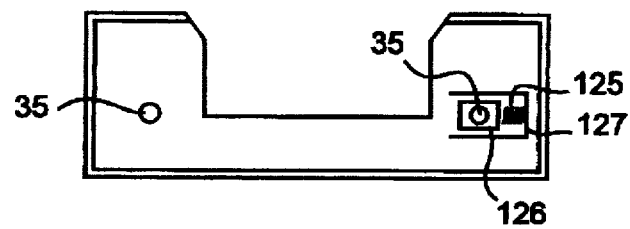
FIG. 10 is a schematic plan view, showing one of the two pivot pins being mounted on a movable support system.
Figure 11:
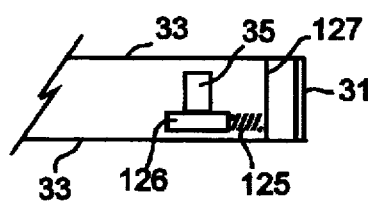
FIG. 11 is a detailed side view showing one pivot pin mounted on a movable support system.

The third embodiment, which is shown in FIGS. 10 and 11 of the drawings, has one of the pivot pins mounted on portion of the supporting part for sideways movement, the sideways movement of the pivot pin providing the lateral deflection of the pivot pin. Said pivot pin is slidably mounted on a movable support system 126 for sideways movement. Said movable support system 126 is contained in the interior structure 127. A resistance means is provided for resiliently resisting sideways movement of the pivot pin. Said resistance means comprises a compression spring 125.

Figure 12:
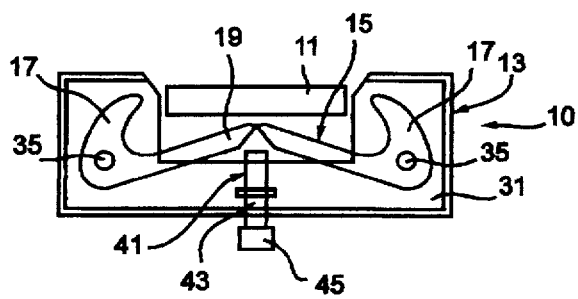
FIG. 12 is a schematic plan view of an engaging device according to another embodiment incorporating a control means operable to move the engaging part from the engaging position to the release position.

In the first, second and third embodiments the engaging device was moved from the engaging position to the release position simply by applying a pulling force between the object and the engaging device of sufficient magnitude to cause the arm portions to swing about their pivot axes and thereby cause the bridge portion to move from the first extreme position through the unstable zone into the second extreme position. There may, however, be situations where it is undesirable or inappropriate to have to apply a pulling force between the object and the engaging device to effect release of the object. To accommodate such situations, an engaging device according to the fourth embodiment as shown in FIG. 12 is provided with control means 41 for manually operating the engaging device to move the engaging part from the engaging condition to the released condition. The control means 41 comprises a control member 43 mounted for reciprocal movement in the housing 31 for movement towards and away from the bridge portion 19 of the engaging part 15. One end of the control member 43 is engagable with the bridge portion 19 when the latter is in the first extreme position (corresponding to the engaging condition of the engaging device) such that it can push the bridge portion from that position through the unstable zone into the second extreme position. The other end of the control member is exposed for engagement by the user and in this embodiment is provided with a button 45 for such purpose.

Figure 13:
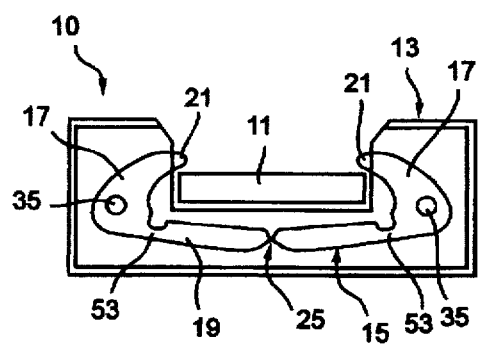
FIG. 13 is a plan view of an engaging device according to another embodiment, shown in an engaging position.
Figure 14:
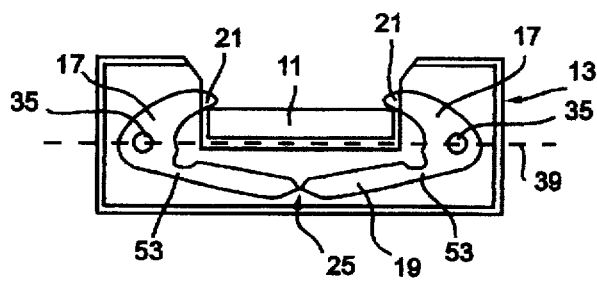
FIG. 14 is a view similar to FIG. 12 with the exception that it illustrates the reaction of the engaging device in circumstances where there is an attempt to release the engaging device from the object being engaged without first moving the engaging part into the release condition.
Figure 15:
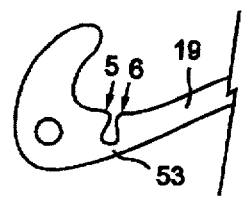
FIG. 15 is a detailed plan view of a section of the engaging part as the engaging device is in either one of the two stable conditions.
Figure 16:
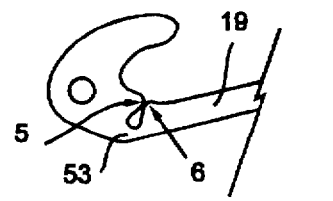
FIG. 16 is a view similar to FIG. 15 with the exception that the engaging part is in an unstable condition as it moves into either one of the two stable conditions.
Figure 17:
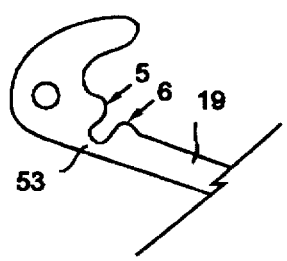
FIG. 17 is also a view similar to FIGS. 15 and 16 with the exception that the resilient portion extends in circumstances where there is an attempt to release the engaging device from the object being engaged without first moving the engaging part into the release condition.

There may be situations where it is desirable to ensure that the engaging device cannot be operated to release an object simply by applying pulling forces between the object and the engaging part. Such a need can be met by an engaging device according to the embodiment shown in FIGS. 13 and 14 of the accompanying drawings. In this embodiment, the engaging part 15 is provided with a weakening which allows the arm portions to deflect without resulting in movement of the bridge portion from a stable position being occupied. This weakening is achieved by the provision of a resilient portion 53 on the inner edge of the engaging part in the vicinity of the junction between the bridge portion 19 and each arm portion 17. If there is an attempt to detach the object from the engaging device simply by pulling on the object, reaction forces between the object and the engaging part causes the arm portions to deflect about the resilient portion (as shown in FIG. 14 of the drawings) with the result that the bridge portion is caused to deflect away from the line between the two pivot pins 35 rather than towards it. While not shown in the drawings, the engaging device according to this embodiment requires a control means or other system for causing the engaging part to assume the release condition as the engaging part cannot move from the engaging condition to the release condition by the application of force to the arm portions. This arrangement does, however, allow the engaging part to move from a release condition to an engaging position by contact of the object with the bridge portion when the latter extends into the recess.

Where resilient portions 53 are provided they may form flexure points for the bridge portion additional to the lateral deflection of the pivot pins. The additional flexure points may accommodate some of the resilient deflection of the pivot pins. There may be situations where it is desirable to ensure that a certain degree of rigidity is kept in the engaging part in order for the engaging device to operate satisfactorily. The said weakening can be constructed to minimize the effects that said additional flexure points can have in relation to the sharpness of the snap-action of the engaging part when moving into the engaging position. FIGS. 15, 16 and 17 of the drawings illustrate how rigidity can still be maintained in the engaging part while comprising a resilient weakening section.

When the engaging part is in one or the other of the two stable positions (as shown in FIG. 15), portions 5 and 6 are kept slightly apart; whereas when the engaging part moves from the release to the engaging position (as shown in FIG. 16), portions 5 and 6 abut one another and provide the desired rigidity to the engaging part. When the engaging part is in the locking position and when force is applied to the arm portions which induces stretching of the resilient portion of the weakening (as shown in FIG. 17), portions 5 and 6 move apart from each other as stretching occurs in the resilient portion.

Figure 18:
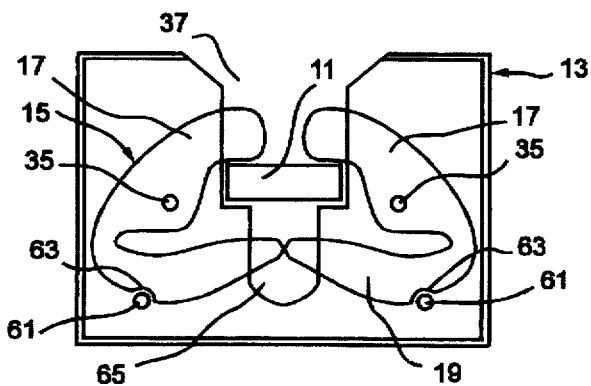
FIG. 18 is a schematic plan view of an engaging device according to still another embodiment.

The embodiment shown in FIG. 18 of the drawing is directed to an engaging device which securely locks the object and resists unintentional releasing of the object even in circumstances where an extreme force is applied to the arm portions by the object. This is achieved by constructing the engaging part so that the bridge portion 19 extends beyond the pivot pins 35 on which the arm portions are mounted. As a result of this arrangement and the configuration of the bridge portion, the latter has a tendency to deflect away from the line extending between the pivot pins rather than towards the line when a pulling force is applied between the object and the engaging device. The supporting part is provided with support pins 61 against which the engaging part bears when in the engaging position, (as shown in the drawing). The support pins provide support for the engaging part to prevent it from deflecting excessively in circumstances where an extreme force is applied to the arm portions by the object 11. The engaging part has notches 63 which receive the pins.

A further feature of the embodiment of FIG. 18 is an aperture 65 provided in the housing 31 to provide access to the underside of the bridge portion 19 so that it can be manipulated manually between its two extreme positions. In this embodiment, the aperture 65 opens onto the inner edge of the recess 37.

Figure 19:
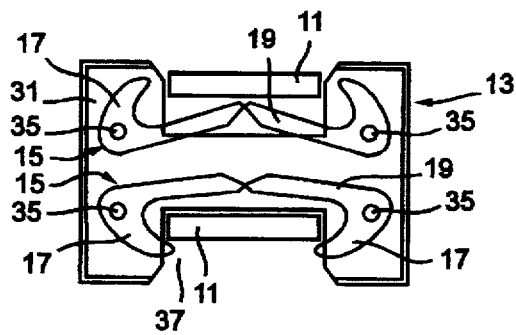
FIG. 19 is a plan view of an engaging device according to still another embodiment incorporating a pair of opposed engaging parts, with one of the engaging parts being shown in an engaging condition and the other being shown in a release condition.

The embodiment shown in FIG. 19 of the drawings is directed to an engaging device which has two engaging parts, so allowing the device to releasably connect two objects together. Each engaging part can operate independently of the other. An access opening (not shown) may be provided in the housing to facilitate manual manipulation of the bridge portion.

Figure 20:
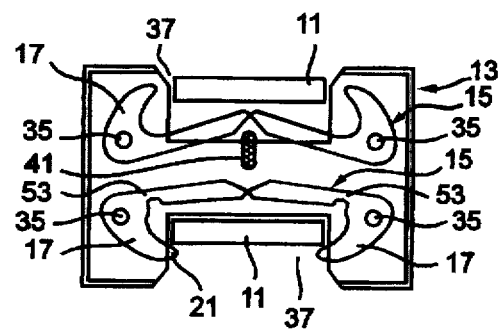
FIG. 20 is a plan view of an engaging device according to still another embodiment which is similar to the embodiment shown in FIG. 19 with the exception that a control means is provided for selectively moving each of the engaging parts separately from the engaging position to the release position.

The embodiment shown in FIG. 20 of the drawings is somewhat similar to the embodiment shown in FIG. 19 with the exception that one of the engaging parts 15 is provided with a resilient portion 53 which prevents separation of that engaging part from the object simply by a pulling action. To allow the engaging part to release the object, there is provided a control means 41.

Figure 21:
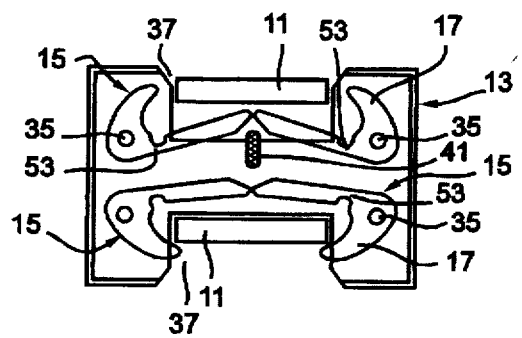
FIG. 21 is a plan view of an engaging device according to another embodiment somewhat similar to the embodiment of FIG. 20.

A variation to the embodiments in FIG. 20 is the engaging device shown in FIG. 21 in which each of the engaging parts has resilient portions 53 so requiring the control means 41 to be able to operate each engaging part.

In the embodiments of FIGS. 20 and 21 an access opening could be provided as an alternative to the control means 41.

The embodiments of FIGS. 19, 20 and 21 illustrate the two engaging parts operating in a common plane. It will be appreciated, however, that the two engaging parts can be disposed angularly with respect to each other.

Figure 22:
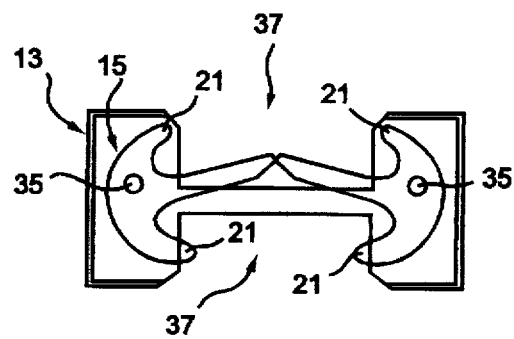
FIG. 22 is a plan view of an engaging device according to still another embodiment in which the engaging part has provision on two sides thereof for engaging an object.

The previous embodiments shown in FIGS. 20 and 21 provide engaging devices which can connect two objects together but they each utilise two engaging parts. An alternative to the two engaging parts is offered by the embodiment shown in FIG. 22 of the drawings where there is only one engaging part but it is provided with two pairs of claws 21. The engaging device according to this embodiment has two recesses 37 in opposed relation in the supporting part and one pair of claws is associated with each recess.

Figure 23:
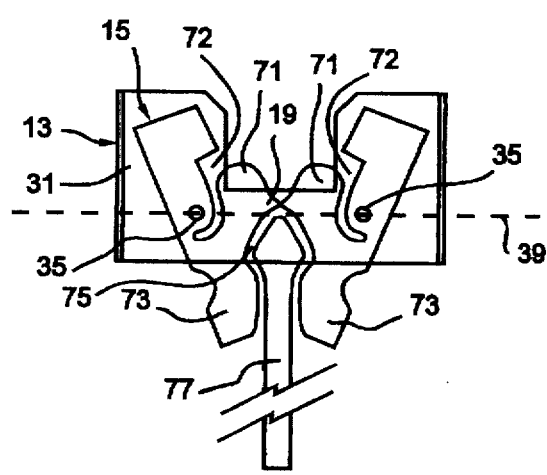
FIG. 23 is a schematic view of an engaging device according to still another embodiment which is well adapted for use as a suspension system which can be released from a remote location using an appropriate releasing tool.

A further embodiment of the engaging device is shown in FIG. 23 of the drawings. In this embodiment, the bridge portion 19 has two spaced apart protrusions 71, each of which extends to a location in the vicinity of a respective one of the claws 18 to define a gap 72 therebetween. With this arrangement, the engaging device can engage an object of thin cross-section in the gaps 72. This is because the engaging device can be constructed with the recess having a depth less than that which would be required without the protrusion.

The embodiment also has a pair of rearward extensions 73 provided on the engaging part. The rearward extensions 73 extend beyond the housing 31 and provide a means by which the engaging part can be manipulated between the engaging and release conditions.

Figure 24:
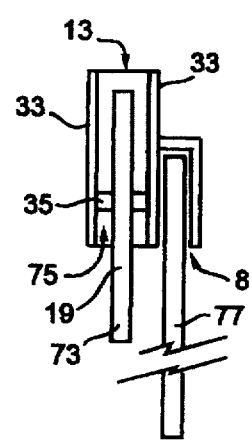
FIG. 24 is a side view of the embodiment described in FIG. 23 which shows how the tool is retained in the second recess as the engaging device is about to be remotely engaged.

A cavity 75 is defined between the rearward extensions 73 and is adapted to receive a tool 77 which can be used to support the engaging device when it is being removed. The tool can be used to apply a force to the bridge portion of the engaging part so as to cause it to move from the engaging condition to the release condition and as the engaging part releases the object, it engages the tool. When the engaging part moves into the release condition, it embraces the tool so that it is supported on the end of the tool. This allows the user to hold the engaging device by means of the tool from a remote location. This is particularly useful in a situation where the engaging device is being mounted in an elevated location which is not particularly accessible to the user. When the object is about to be engaged from a remote location, the tool is lodged and retained in a second recess 8 as shown in FIG. 24 of the drawings, thereby enabling the engaging part to engage the object as pressure is exerted onto the engaging device by the tool. Once the engaging device is engaged to the object the tool is then dislodged from the second recess.

Figure 25:
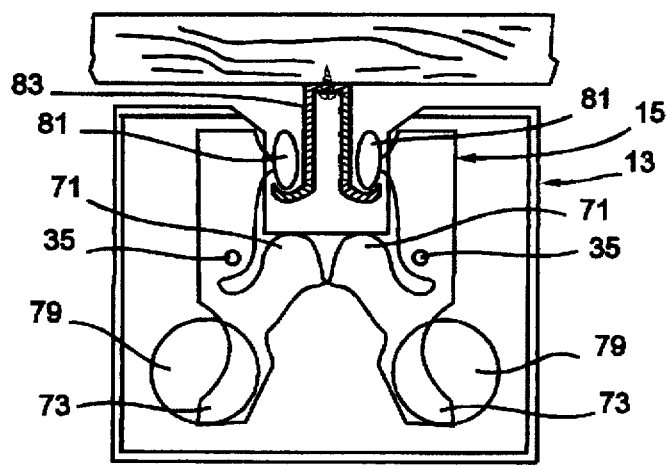
FIG. 25 is an elevational view of an engaging device according to another embodiment adapted to engage a track for movement therealong, the engaging device being shown in the engaging position.
Figure 26:
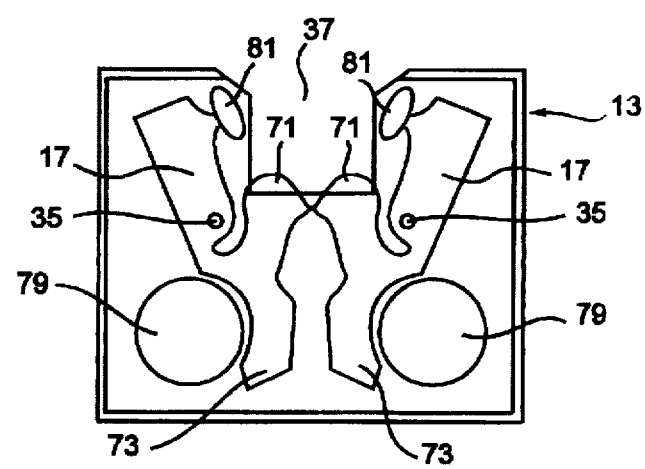
FIG. 26 is a view of the engaging device shown in FIG. 25 with the exception that it is shown in the release condition separated from the track.

The embodiment shown in FIGS. 25 and 26 of the drawings also has two protrusions 71 and rearward extensions 73 similar to the previous embodiment. In this embodiment, however, the rearward extensions 73 do not extend beyond the housing but rather co-operate with openings 79 which are formed in the housing and which provide access to the extensions. This arrangement provides a safety feature in that it ensures that there are no protruding parts which could be accidentally operated to cause the engaging device to release.

Another feature of this embodiment is that the arm portions do not have claws but rather support rollers 81 which can releasably engage a track 83 on movement of the engaging part 15. A particular advantage of this construction is that the engaging device can be fitted onto the track at any position along the length of the track. This arrangement overcomes a disadvantage of many conventional structures which carry rollers for engagement with a track, the disadvantage being that the structure can only be fitted onto the track from the ends of the track or through entry points provided at intervals along the length of the track.

Figure 27:
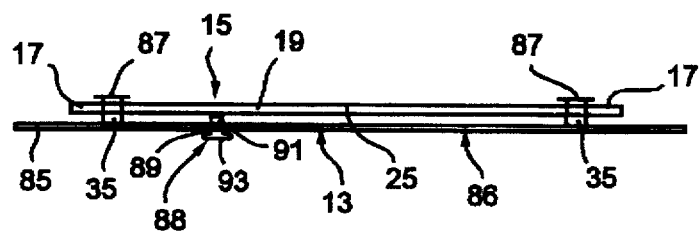
FIG. 27 is a schematic side view of an engaging device according to still another embodiment having stop means to limit the extent of lateral deflection of the engaging part as it moves through an unstable zone between the engaging and release conditions.

In the embodiments described previously, the engaging part 15 is accommodated within the cavity in the housing 31 and the side walls 33 of the housing can serve to limit the extent of lateral deflection of the engaging part as it passes between the two stable positions. An alternative arrangement is shown in FIG. 27 of the drawings where the supporting part 15 simply comprises a plate 85 which carries resilient pivot pins 35. The free ends of the resilient pivot pins have stops 87 for retaining the engaging part in position. A limiting means 88 is provided for limiting the extent of lateral deflection of the engaging part away from the plate. In this embodiment, the limiting means 88 comprises a pin 89 mounted on the bridge portion 19 of the engaging part and extending through a slot (not shown) formed in the plate. The free end of the pin extends beyond the opposed face 86 of the plate 85 and has a protrusion 93 so dimensioned that it cannot pass through the slot formed in the plate.

Figure 28:
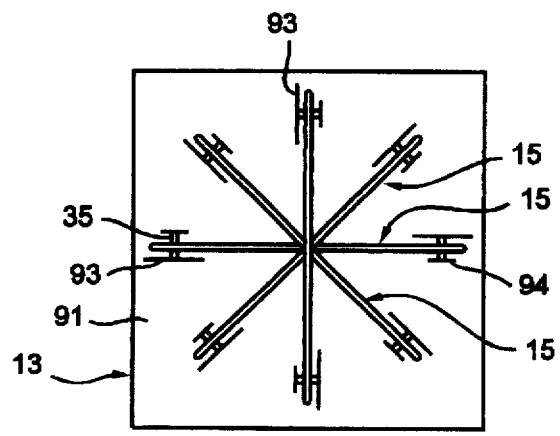
FIG. 28 is a plan view of an engaging device according to still another embodiment for releasably engaging an object in a claw-like fashion.

In FIG. 28 of the drawings there is illustrated an embodiment in which there are a plurality of engaging parts 15 mounted on a common support part 13. The engaging parts are arranged in angular fashion to provide a claw-like structure which can engage around an object. The various engaging parts 15 contact each other in the central region such that they are caused to move in unison between the engaging and release conditions. A control means (not shown) may extend through an opening in the plate 91 and be operatively coupled to the engaging parts 15 so that they can be operated remotely. The engaging parts are mounted on resilient pivot pins 35 each of which is supported on one end of a bracket 93. The other end of each pivot pin 35 has a protrusion 94 for retaining the engaging part in position.

The engaging device according to this embodiment is particularly suitable for engaging objects of compact shape such as generally square and spherical objects. In other embodiments, the arm portions of the engaging parts 15 can be of various sizes and configurations to facilitate gripping of objects of irregular shape. This arrangement may find particular application in the area of robotics where items have to be engaged for some form of manipulative process and then released.

Figure 29:
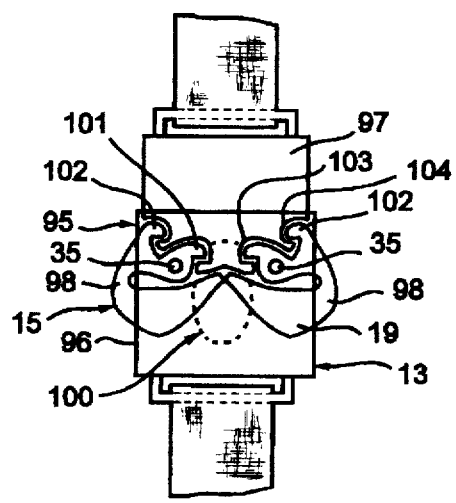
FIG. 29 is a schematic view of an engaging device according to still another embodiment adapted for use in a buckle assembly.

The embodiment shown in FIG. 29 of the drawings is directed to an engaging device suitable for use in a locking device. The locking device is well adapted for use in a buckle assembly 95 comprising first and second parts 96, 97 respectively adapted to be releasably coupled together. The first part 96 incorporates the engaging device according to the embodiment. In this embodiment, the bridge portion 19 extends beyond the pivot pins 35 and also beyond opposed sides of the housing 31. This allows the engaging part to be moved from the engaging condition to the released condition simply by pressing the exposed ends 98 of the bridge portion together. A further feature of the engaging device of this embodiment is that each arm portion has two engaging fingers 101, 102 each adapted to engage in complimentary recesses 103, 104 formed in the second part 97 of the buckle. The engaging fingers 101, 102 of each arm portion extend to opposed sides of the pivot pin 35 on which the arm portion is mounted. As a result of this arrangement, pulling forces between the engaging device and the object do not apply rotational torque to the arm portions but rather are simply transferred to the resilient pivot pins 35. Because no torque is applied to the arm portions, there are no forces exerted on the bridge portion of the engaging part and so locking is achieved. An access opening 100 may also be provided for manual operation of the engaging part.

Figure 30:
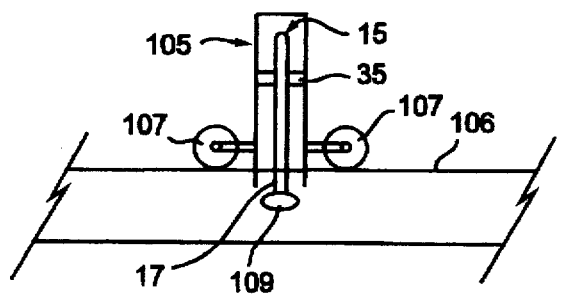
FIG. 30 is a schematic view of an engaging device according to still another embodiment.

The embodiment shown in FIG. 30 is directed to an engaging device incorporated in a mobile structure 105 adapted to travel along a track 106. The mobile structure 105 has wheels 107 for rolling movement along the track 106 and an undercarriage 108 for releasably engaging the underside of the track to retain the mobile structure on the track. The undercarriage comprises the engaging device which has rollers 109 on the arm portions 17 which releasably engage the underside of the track. The mobile structure 105 can be installed on, and removed from, the track 106 at any position along its length simply by moving the engaging device between the engaging and release conditions as appropriate.

Figure 31:
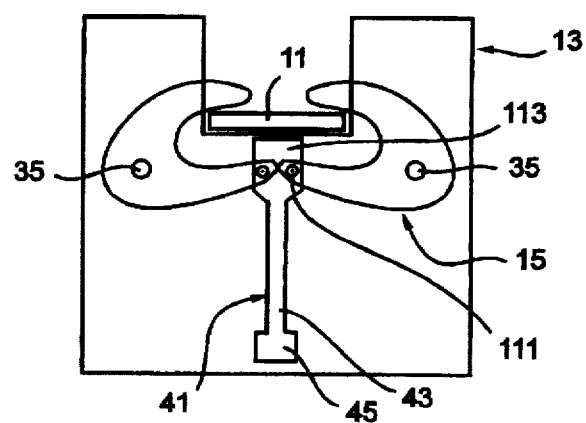
FIG. 31 is a schematic view of an engaging device according to still another embodiment.

Some of the embodiments described earlier have had a control means 41 operable to cause the engaging part to move from the engaging condition to the release condition. In these embodiments, the control means is disposed adjacent to but not connected to the engaging part and is movable into engagement with the engaging part to cause the latter to move from the engaging condition to the release condition. The embodiment shown in FIG. 31 of the drawings is somewhat similar in that it is provided with a control means 41 comprising a control member 43 and a button 45 at the free end of the control member. In this embodiment, however, the control member is pivotally connected to the engaging part at pivots 111. The pivots 111 each comprise a pivot pin located on the control member and a pivot hole in the engaging part. The pivot hole is slightly oversized in relation to the pivot pin received therein to accommodate the movement. Furthermore, the control means has an extension 113 which extends beyond the engaging part so that it protrudes into the recess 37 when the engaging part is in the release condition. With this arrangement, an object entering the recess can contact the extension 113 and cause the engaging part to be moved from the release condition to the engaging condition. This arrangement has a further benefit in that the extension 113 functions in a similar manner to the protrusions 71 of the embodiment shown in FIG. 23 of the drawings, so allowing thin objects to be releasably engaged by the device. This is particularly useful as it allows the engaging device to be constructed with the recess 37 not as deep as would be required without the extension.

Figure 32:
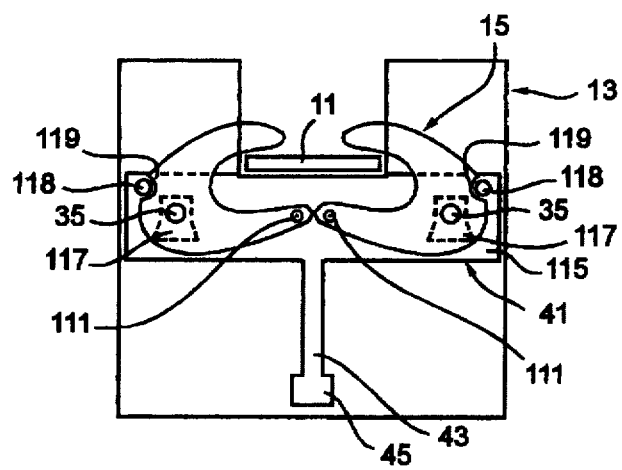
FIG. 32 is a schematic view of yet another embodiment.

The embodiment shown in FIG. 32 is directed to an engaging device which securely locks the object and resists unintentional releasing of the object. In this embodiment the control means 41 comprises a slide 115 provided at the inner end of the control member 43. The slide 115 is pivotally connected to the engaging part 15 at pivots 111 and is movable reciprocally towards and away from the recess to cause movement of the engaging part between the engaging and release conditions. The slide 115 is provided with slots 117 in which the pivot pins 35 are received to allow the reciprocal movement of the slide. Said slots 117 are shaped in such a way that they locate themselves against the pivot pins when the engaging part goes into the engaging condition. The slide 115 stops the pins from laterally deflecting away from each other and this ensures that the engaging device remains locked. The slide also carries support pins 118 against which the engaging part locates when in the engaging condition, as shown in the drawing. Notches 119 are provided in the engaging part to receive the support pins 118 which also ensure that the engaging device remains locked.

Figure 33:
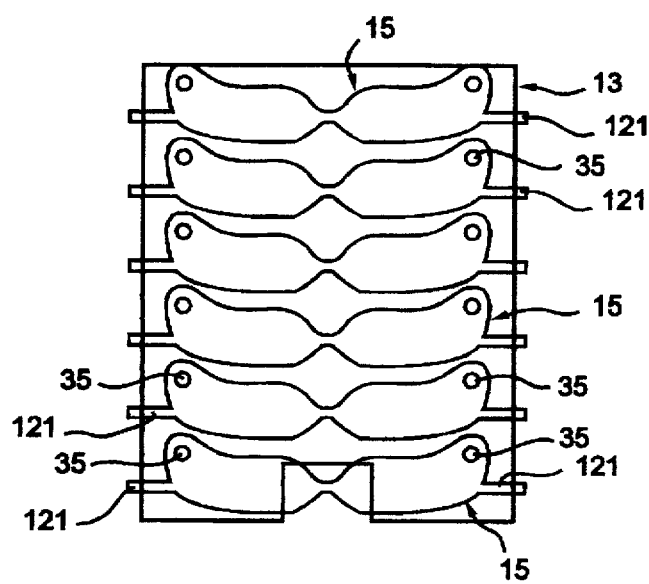
FIG. 33 is a schematic view of an engaging device according to a still further embodiment in which there are a plurality of engaging parts each incorporating engaging pins, the pins being shown in an extended position.
Figure 34:
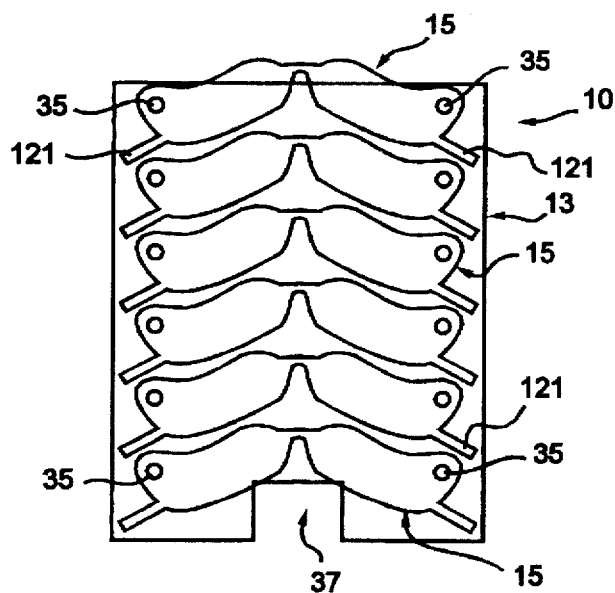
FIG. 34 is a view similar to FIG. 33 with the exception that the engaging device is in a condition where the pins are in a retracted position.

In FIGS. 33 and 34 of the drawings there is illustrated a further embodiment having a plurality of engaging parts 15 mounted on a common supporting part 13. The engaging parts 15 are mounted in a series with each engaging part moving about respective resilient pivot pins 35. The arrangement of the engaging parts in series is such that they are operable in a "domino" fashion in the sense that operation of either one of the engaging parts at the ends of the series causes the remaining engaging parts to operate sequentially. The arm portions of each engaging part is provided with a projection 121 which provides an engaging pin. When the engaging parts are in one of the stable conditions, the engaging pins project sidewardly from the housing 31 (as shown in FIG. 33 of the drawings) and when the engaging parts are in the other stable condition, the engaging pins are disposed within the confines of the housing (as shown in FIG. 34).

The engaging pins are arranged to be received in complementary holes formed in an object to which the engaging device is adapted to De releasably secured.

From some of the foregoing embodiments it is evident that the engaging device can be so constructed that forces of different magnitudes are required to engage and release an object. One way in which this can be achieved is to provide weakening sections in the bridge portion, as described. Another way is to construct the engaging part so that the hinge 25 is asymmetric in relation to the line between the two pivot axes when the engaging part is in the two stable conditions. With this arrangement, less force is required to move the engaging part from a stable condition in which the flexure point is closer to the line between the two axes than is required to move the engaging part from the stable condition in which the flexure point is farther from the line.

The tendency for the bridge portion to assume one or the other of the extreme positions is manifested as a snapping action whereby the bridge portion snaps from one extreme position to the other extreme position after passing through the unstable zone. This snapping action generates a snapping sound which provides an audible indication that the engaging part has moved between the engaging condition and the release condition.

In the various embodiments described, there are features which are described in relation to some embodiments but which are not described and shown as being present in other embodiments. It will be appreciated that such features may, where appropriate, have application to all of the embodiments.

The various embodiments which have been described and illustrated demonstrate that the engaging device according to the invention has a multitude of applications. It should, however, be appreciated that the invention is certainly not limited to the various embodiments described.

What is claimed is:

1. An engaging device for releasably engaging an object, the engaging device comprising a supporting part, an engaging part mounted on the supporting part for pivotal movement about two spaced apart axes between two stable conditions one being an engaging condition and the other being a release condition, wherein the engaging part comprises a bridge portion positioned between said pivot axes, wherein a weakening means is provided on the bridge portion and wherein abutment portions are provided on opposed sides of said weakening means whereby the abutment portions are adapted to abut one another during movement of the engaging part from the release condition to the engaging condition.

2. An engaging device for engaging an object, the engaging device comprising a supporting part, an engaging part mounted on the supporting part for pivotal movement about two spaced apart axes between two conditions one of which is an engaging condition, wherein said engaging device includes means for at least one of said pivot axes being laterally deflectable each time the engaging part moves between the two conditions and wherein said two axes are defined by means carried on two portions of the supporting part, said portions being fixed with respect to each other during movement of the engaging part between the two conditions.

3. An engaging device according to claim 2 wherein at least one of said pivot axes is defined by a pivot pin, said pivot pin being resiliently bendable laterally during movement of the engaging part between the two conditions.

4. An engaging device according to claim 3 wherein at least one end of the resiliently bendable pivot pin is fixed to one of said two portions of the supporting part.

5. An engaging device according to claim 2 wherein at least one of said pivot axes is defined by means slidably mounted on one of said two portions of the supporting part for sideways movement laterally of the respective pivot axis.

6. An engaging device according to claim 5 wherein said at least one of said pivot axes is defined by a pivot pin.

7. An engaging device according to claim 5 wherein a resistance means is provided for resisting sideways movement of said at least one of said pivot axes.

8. An engaging device according to claim 7 wherein the resistance means comprises a compression spring.

9. An engaging device according to claim 5 wherein a locking means is provided for selectively locking at least one of said pivot axes in one or more positions along the extent of possible sideways movement thereof.

10. An engaging device according to claim 2 wherein said two portions of the supporting part comprise a housing for accommodating the engaging part.

11. An engaging device according to claim 10 wherein said engaging part is provided with extension means, said extension means extending beyond said housing.

12. An engaging device according to claim 11 wherein said extension means are disposed within the confines of said housing and an opening means is provided in said housing for access to said extension means.

13. An engaging device according to claim 2 wherein said two conditions are stable conditions.

14. An engaging device according to claim 2 wherein the engaging part comprises a bridge portion extending between said pivot axes, the bridge portion being adapted to articulate to accommodate movement of the engaging part between the two conditions.

15. An engaging device according to claim 14 wherein at least part of said bridge portion passes through a centre line extending between said pivot axes as the engaging part moves between the two conditions.

16. An engaging device according to claim 14 wherein the distance between the two axes when the bridge portion is in either one of the two conditions is such as to cause compressive stresses in the bridge portion during movement of said bridge portion between the two conditions.

17. An engaging device according to claim 2 wherein the engaging part is urged between the two conditions upon application to the engaging part of a contact force of sufficient magnitude.

18. An engaging device according to claim 2 wherein the engaging part co-operates with said supporting part to engage an object by in combination one with the other embracing the object, whereby said engaging part engages said object upon application of a contact force of sufficient magnitude to the engaging part by the object.

19. An engaging device according to claim 18 wherein an access opening is provided in said supporting part for manual manipulation of the engaging part between the two conditions.

20. An engaging device according to claim 14 wherein means are provided for causing the engaging part to lock in the engaging condition upon an attempt being made to disengage the object from the engaging part.

21. An engaging device according to claim 20 wherein said means provided for causing the engaging part to lock in the engaging condition comprises at least one weakening in the engaging part.

22. An engaging device according to claim 21 wherein said at least one weakening is provided by a notch in the engaging part.

23. An engaging device according to claim 21 wherein said at least one weakening is of resilient construction.

24. An engaging device according to claim 20 wherein the supporting part is provided with support means against which the engaging part bears when in the engaging condition in order to prevent excessive deflection of the engaging part.

25. An engaging device according to claim 14 wherein said bridge portion extends beyond the two axes.

26. An engaging device according to claim 14 wherein the engaging part is of such construction that the force required to move the engaging part in one direction between the two conditions is of a different magnitude to the force required to move the engaging part in the opposite direction.

27. An engaging device according to claim 14 wherein said engaging part is adapted to move from said engaging condition to the other of said two conditions being a release condition upon the application of a force of predetermined magnitude to said engaging part, said force arising as a result of reaction between a portion of the engaging part other than said bridge portion and said object on the application of a pulling force of sufficient magnitude between the object and the engaging device.

28. An engaging device according to claim 27 wherein said portion of the engaging part other than said bridge portion comprises engaging means to engage said object.

29. An engaging device according to claim 28 wherein said engaging means comprises two spaced apart arm portions with the bridge portion extending therebetween.

30. An engaging device according to claim 29 wherein the engaging part comprises two fingers extending to opposed sides of the pivot axis about which the arm portion moves, said fingers being adapted to releasably locate in complimentary recesses in the object.

31. An engaging device according to claim 27 further comprising a control means operable to move said engaging part from the engaging condition to the release condition.

32. An engaging device according to claim 31 wherein said control means comprises a control member movably mounted on the supporting part for operative engagement with the engaging part.

33. An engaging device according to claim 28 wherein the engaging part is provided with extension means other than said engaging means extending outwardly therefrom and wherein initial contact with the object for the purpose of causing the engaging part to move from the release condition to the engaging condition is made by way of said extension means.

34. An engaging device according to claim 28 wherein said engaging part is provided with extension means other than said engaging means or part thereof to manipulate said bridge portion from one condition to the other.

35. An engaging device according to claim 34 wherein a cavity is defined between said extension means, said extension means being adapted to engage an object.

36. An engaging device according to claim 2 wherein the engaging device comprises a control means comprising a slide, said slide being operatively connected to said engaging part and whereby said slide prevents said spaced apart axes from deflecting away from each other when the engaging device is in the engaging condition.

37. An engaging device according to claim 2 wherein at least one of said pivot axes is defined by a pivot pin, said pivot pin being bendable laterally during movement of the engaging part between the two conditions.

38. An engaging device according to claim 2 wherein at least one of the two pivot axes is moveable relative to the supporting part for selective adjustment in order to vary the spacing between the pivot axes and thereby control the magnitude of the force necessary to move the engaging part between one of the two conditions, said at least one of the pivot axes being moveable throughout a range of possible positions to provide said selective adjustment, and means being provided for releasably retaining said at least one of said pivot axes in a selected one of said possible positions.

39. An engaging device according to claim 2 wherein said at least one of said axes is resiliently deflectable laterally in a resilient manner thereby to urge the engaging part into one or the other of the two conditions upon application of a force of sufficient magnitude to the engaging part.

40. An engaging device according to claim 2 wherein the engaging part is located to one side of said two portions of the supporting part in a direction along the pivot axes such that the engaging part is offset from said two portions of the supporting part.

41. An engaging device according to claim 2 wherein there is a plurality of said engaging parts mounted on the supporting part.

42. An engaging device according to claim 41 wherein at least some of the engaging parts are mounted for pivotal movement about separate pivot axes whereby the engaging parts provide a claw-like structure for releasably engaging an object.

43. An engaging device according to claim 41 wherein at least two of the engaging parts co-operate one with another such that said at least two of the engaging parts are movable in unison between the two conditions.

44. An engaging device according to claim 2 adapted to releasably engage two objects.

45. An engaging device according to claim 44 wherein there are two of said engaging parts each adapted to engage one of said objects.

46. An engaging device according to claim 44 wherein the engaging part is provided with two pairs of arm portions, each arm portion being adapted to engage one of the objects.

47. An engaging device according to claim 2 wherein said supporting part provides access to the inner side of the engaging part.

* * * * *